July 19, 1966  W. DIELLO  3,261,946
PARKING SWITCH FOR WINDSHIELD WIPER
Filed Aug. 21, 1964

INVENTOR.
WILLIAM DIELLO
BY
Souther, Stoltenberg & Barr
ATTORNEYS

United States Patent Office
3,261,946
Patented July 19, 1966

3,261,946
PARKING SWITCH FOR WINDSHIELD WIPER
William Diello, Syracuse, N.Y., assignor to Eltra Corporation, Brooklyn, N.Y., a corporation of New York
Filed Aug. 21, 1964, Ser. No. 391,155
6 Claims. (Cl. 200—92)

This invention relates to a control system for electric windshield wiper motors and more particularly to a parking switch for such motors which provides dynamic braking for stopping.

The invention contemplates a parking switch which will effect the parking of windshield wiper blades in predetermined positions on a vehicle windshield by using dynamic braking to control a permanent magnet motor which operates the windshield wiper mechanism.

The invention further contemplates the provision of a parking switch for a windshield wiper motor which rotates a conducting plate forming a part of the switch, the control being provided by a manually operated, single pole double throw switch which controls the power circuit between the plate and the armature of the permanent magnet motor.

It is, therefore, a princpal object of this invention to provide a rotating member for a switch to control the current to an electric windshield wiper motor to stop the armature of the motor by using dynamic braking, and also provide a means of parking a windshield wiper blade in a predetermined position.

It is another object of this invention to provide an improved switching system to park an electric windshield wiper motor to place the wiper blades at a predetermined position by dynamically braking.

It is another object of this invention to provide an improved control system to dynamically brake a permanent magnet motor of an electric windshield wiper device to park the wiper blades at a predetermined position which has a minimum number of components to reduce manufacturing costs.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Figure 1:
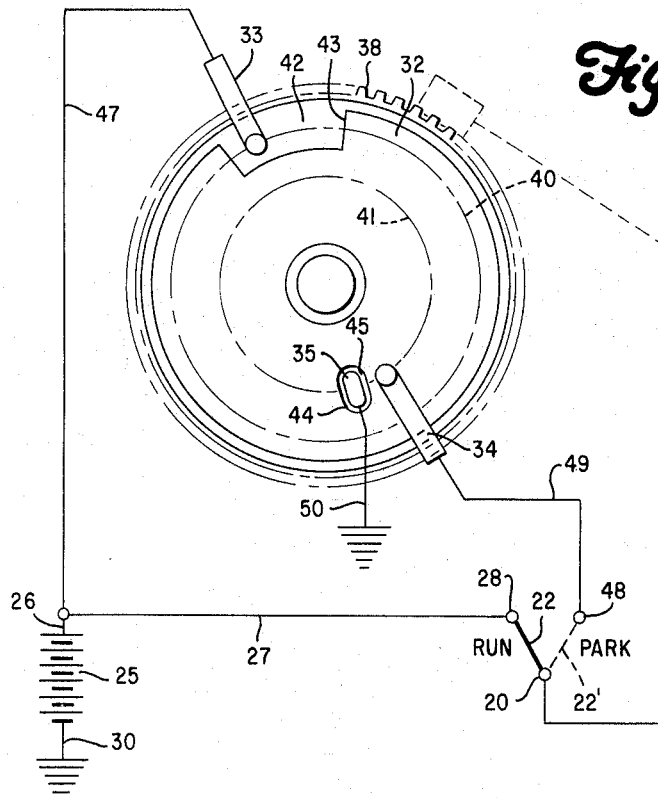
FIG. 1 is a schematic diagram of connections including structural portions of the windshield wiper as related thereto.

Referring to the drawings, particularly to FIG. 1, a diagrammatic view of the invention is shown which illustrates the switching system and the related mechanical elements of an electric windshield wiper motor. In the drawing, a permanent magnet motor 10 is shown diagrammatically which comprises an armature 12, brushes 13 and 14, and two oppositely disposed permanent magnet pole pieces 15. The brush is shown as connected to ground through lead 16, and brush 13 is connected, through a lead 18, to a main terminal 20 of a single pole double throw manually-operated switch 22. Switch 22, as shown in the drawing, is in "RUN" position and conducts electric current to the motor 10 from a battery 25 through leads 26 and 27, and a second switch terminal 28 of the switch 22. The opposite side of the battery 25 is connected to ground through a lead 30, which completes the circuit to the motor through brush 14 and lead 16.

The electric motor 10 is parked by dynamic braking by means including a conducting rotatable plate 32 of special conformation, two contact fingers 33 and 34 of spring material contacting the plate, and a grounded terminal 35 cooperating only with finger 34. The conducting plate 32 is mounted on a rotatable worm gear wheel 38 which is normally driven by the motor 10 being the speed reducing device used in the driving system of the windshield wiper which will not be described in further detail. The gear wheel is formed of a suitable insulating material and is driven by the motor 10 through a conventional worm gear mechanism. The details of mounting the conducting element or plate 32 on the gear 38, and the driving relation between motor and gear wheel are conventional and form no part of this invention.

The two contact fingers 33 and 34 are permanently positioned on a fixed frame portion of the motor and have their ends in sliding contact with the front planar surface of the rotatable plate 32 and slide in spaced circular paths thereon as shown by broken lines 40 and 41, respectively. The conducting path 40 is interrupted by a cut-away portion of the plate so that the finger 33 rides on an insulated area 42 on the gear wheel which is exposed through the opening 43 formed in the cut-away peripheral edge of the plate. The conducting path 41 cooperating with the finger 34 is interrupted by an aperture 44 formed in the plate 32 into which the terminal 35 is fitted with an insulating space 45 between the plate and the grounded terminal 35. It should be noted that the insulating areas 42 and 45 formed by the front face of the gear 38 are positioned in a circumferential relation so that the circuit will be broken between contact finger 33 and the plate 32 when contact finger 34 engages the grounded terminal 35 to dynamically brake the motor 10.

The contact finger 33 is connected to the battery through a lead 47 and lead 26, while the contact finger 34 is connected to a third terminal 48 of the switch 22 through a lead 49. The grounded terminal 35 is fixed to the insulating gear wheel 38 to rotate therewith so as to be in the same plane as plate 32 and is connected to ground through a lead 50 which may consist of the grounded motor casing.

In the operation of the windshield wiper, the switch 22 is manually moved to "run" position to contact the terminal 28, which will allow current to flow from the battery through leads 26, 27, and 18 to energize the motor 10. This will cause the armature of the motor to rotate to drive the gear wheel 38 and the wiper blades in the conventional way and also to rotate the insulated conducting plate 32.

When the windshield wiper is to be stopped and parked at a predetermined position the switch 22 is manually moved to "park" position, as shown at 22', which breaks the main power circuit to the motor 10, and connects the contact blade 34 to the motor armature, so that the electric current will flow through leads 26 and 47 to contact 33 then to plate 32 to the contact 34, through lead 49 and then through the switch to lead 18 to the motor. This path will allow current to flow to the motor causing the motor to continue its operation to further rotate the gear wheel 38 and the plate 32. Rotation of these members will continue until the cut-away portion 43 with its insulating area 42 of the plate 32 reaches the contact finger 33 and breaks the power circuit which, however, will "coast" for a short period due to the kinetic energy of the armature. This coasting action of the motor armature will rotate the gear 38 and the plate 32 sufficiently to cause the contact finger 34 to disengage the plate 32 and then contact the grounded terminal 35. This will short-circuit the motor armature 12, and with the field of the motor from the permanent magnets at full strength will stop the armature by dynamic braking. The braking of the motor armature is designed to occur when the wiper blades are in parked position.

Figure 2:
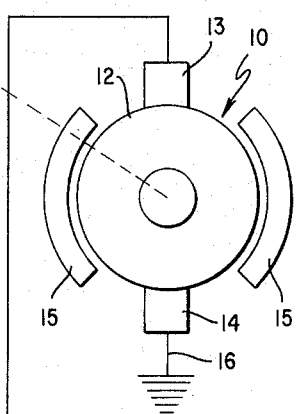
FIG. 2 is a modification of the structure shown in FIG. 1.
Figure 2:
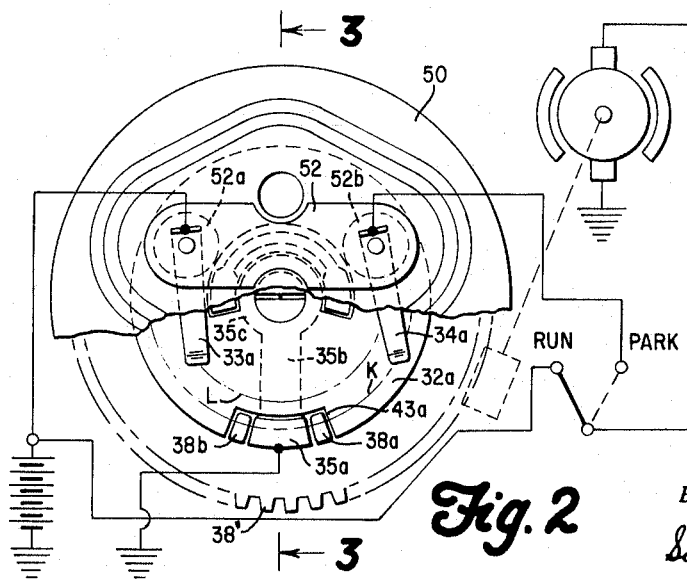
Figure 3:
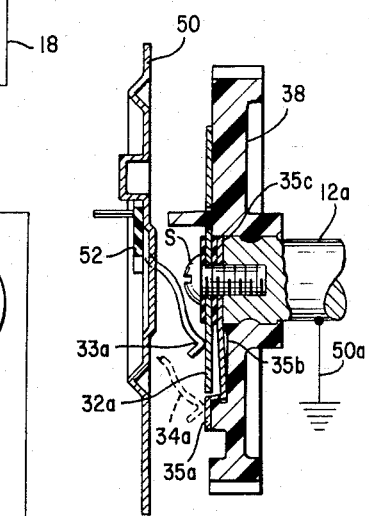
FIG. 3 is a sectional elevation taken along line 3—3 of FIG. 2.

In FIGURES 2 and 3 another modification of the invention is disclosed wherein the worm wheel gear 38' mounted on the grounded shaft 12a is provided with a metal plate 32a of a conformation somewhat different from the metal plate 32 disclosed with reference to the modification shown in FIGURE 1. The metal plate 32a is provided with a peripheral cutout 43a which extends across the front face of the gear wheel 38' for approximately 20°, cooperating with and embracing a pair of raised insulating portions 38a and 38b between which a depressed portion is provided to form a seat for the outer extermity 35a for a "ground" piece 35b which extends radially inwardly below the metal plate 32a as is best seen in FIGURE 3. The radially inwardly extending portion is provided with a circular terminating portion 35c to fit against the terminal end of the shaft 12a. A screw S is provided to fit through central apertures in the metal plate 32a and a central aperture in the portion 35c to thread into a bore in the end face of the motor armature shaft 12a. Insulating means in the form of fiber washers are provided to insulate the metal plate 32a from both the portion 35b and the shaft 12a.

The motor armature is adapted to drive the gear wheel 38' by a worm with the metal plate 32a superimposed over the ground strip 35b to provide relative rotation of these parts with reference to a fixed casing closure plate 50 which is supported in space relation to the worm wheel 38' by supporting means (not shown) best seen in FIGURE 3. The closure plate 50 is provided with openings 52a and 52b which are covered by an insulating plate 52 to which are attached by rivets or the like, a pair of contact fingers 33a and 34a which extend inwardly in the direction of the worm wheel gear 38' to make contact with the front face of the metal plate 32a. The closure plate 50 is held in fixed relation so that the worm gear will move the plate when it is rotated by the electric motor under the contacting tips of the fingers 33a and 34a to touch the metal plate 32a in spaced radial relation, so that as the plate is rotated by the worm gear 38', the contact 33a will touch the metal plate 32a at a circular orbit L to provide a continuous contact with the metal plate. At the same time, the second finger 34a will make contact with the metal plate 32a at a point farther from the center to touch the metal plate at circular orbit K which has a radius so that the finger 34a will move across the cutout portion 43a and also the contact portion 35a of the ground strip, and at the same time will move across the raised portions of insulating material of the worm gear 38'. The front face of the metal plate 32a and the front face of the ground strip 35a and also the faces of the raised portions 38a and 38b are all rotated in substantially the same plane so that the finger 34a may move across the assembly during the rotation of the worm gear without excessive vibration or noise.

Referring again to FIGURE 2, the battery is connected on its ungrounded side to the contact finger 33a and also connected to the "RUN" contact of a double throw switch which controls the "RUN" and "PARK" circuit relations of the motor. The "PARK" contact is connected to the contact finger 34a and, as has been mentioned before, the ground strip 35a is grounded by the structure which has already been described. With the switch in "RUN" position as shown in FIGURE 2, the battery is connected directly to the motor armature by the "RUN" contact of the switch. When the switch is moved to the "PARK" contact of the switch, the circuit mentioned hereinbefore is opened, but the motor power circuit is yet maintained in closed position to allow the electric motor to operate, by completing the circuit from the contact finger 33a to the metal plate 32a, then to the second contact finger 34a which is connected to the "PARK" contact of the switch which then connects the electric motor to the battery and will allow its continuous operation. When however the cutaway portion 43a of the metal face plate 32a moves under the contact finger 34a, the motor power circuit is broken as soon as the contacting tip of the finger 34a rides upon the front face 38a of the insulating spacer. Due to the kinetic energy of the rotating armature of the motor, the armature will continue to rotate even though the electric power circuit to it has been broken so that the contact finger 34a will move into contact relation with the front face of the ground strip 35a which will immediately dynamically brake the motor armature to stop the motor within a very few revolutions.

When it is desired to again close the power circuit of the electric motor, the switch will be moved to the "RUN" contact which removes the switch already described including the contact fingers 33a and 34a from the power circuit to allow the electric power to operate under normal operating conditions.

It is to be understood that the above-detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a parking switch for an electric windshield wiper, an electric motor for driving the wiper blades having a rotatable armature, a rotatable element in driving relation driven by said armature, a conducting element attached to the rotatable element to be rotated thereby, a pair of fixed contact members adapted to contact the conducting element at different circular paths during the rotation thereof, a pair of cut-away portions in the conducting element to break the electrical circuit between the conducting element and the contact members, and a grounded element cooperating with one of the cut-away portions to ground one of the contact members at a predetermined position.

2. In a parking switch for an electric windshield wiper, an electric motor for driving the wiper blades having a rotatable armature, a rotatable element in driving relation driven by said armature, a conducting disc-shaped element attached to the rotatable element to be rotated thereby, a pair of fixed contact members adapted to contact the conducting element at different circular paths during the rotation thereof, one of said contact elements being adapted to be connected in the armature circuit of the motor, a pair of cut-away portions in the conducting element to break the electrical circuit between the conducting element and the contact members, and a grounded element cooperating with one of the cut-away portions to ground the contact member in the motor armature circuit at a predetermined position to short-circuit the armature.

3. In a parking switch for an electric windshield wiper, an electric motor for driving the wiper blades having a rotatable armature and a permanent magnet field, a rotatable element in driving relation driven by said armature, a conducting disc-shaped element attached to the rotatable element to be rotated thereby, a pair of fixed contact members adapted to contact the conducting element at different circular paths during the rotation thereof, one of said contact elements being adapted to be connected in the armature circuit of the motor, a pair of cut-away portions in the conducting element to break the electrical circuit between the conducting element and the contact members, and a grounded element cooperating with one of the cut-away portions to ground the contact member in the armature circuit of the motor at a predetermined position to short-circuit the armature and apply dynamic braking.

4. In a parking switch for an electric windshield wiper, an electric motor for driving the wiper blades having a rotatable armature, a rotatable element in driving relation driven by said armature, a conducting element attached to the rotatable element to be rotated thereby, a pair of fixed contact members adapted to contact the conducting element at different circular paths during the rotation thereof, a pair of cut-away portions in the conducting element to break the electrical circuit between the conducting element and the contact members at predetermined positions of the conducting element, and a grounded element cooperating with one of the cut-away portions to ground one of the contact members at a predetermined position having a relation to the first predetermined position.

5. In a parking switch for an electric windshield wiper, an electric motor for driving the wiper blades having a rotatable armature and a permanent magnet field, a rotatable element in driving relation driven by said armature, a conducting plate element attached to the rotatable element to be rotated thereby, a pair of fixed contact members adapted to contact the conducting plate element at different circular paths during the rotation thereof, a pair of cut-away portions in the conducting element to break the electrical circuit between the conducting plate element and the contact members having a predetermined relation to the wiper blades, one of said contact elements being adapted to be connected in the armature circuit of the motor, and a grounded element cooperating with one of the cut-away portions to ground the contact member in the armature circuit of the motor at a predetermined position to short-circuit the armature and apply dynamic braking thereto to stop the wiper blades.

6. In a parking switch for an electric windshield wiper, an electric motor for driving the wiper blades having a rotatable armature, a rotatable element in driving relation driven by said armature, a conducting element attached to the rotatable element to be rotated thereby, a pair of fixed contact members adapted to contact the conducting element at different circular paths during the rotation thereof, a cut-away portion in the conducting element to break the electrical circuit between the conducting element and the contact members, and a grounded element cooperating with the cut-away portion to ground one of the contact members at a predetermined position.

No references cited.

BERNARD A. GILHEANY, *Primary Examiner.*